United States Patent
Lin et al.

(10) Patent No.: US 8,218,621 B2
(45) Date of Patent: Jul. 10, 2012

(54) DATA-MAPPING METHOD AND CACHE SYSTEM FOR USE IN A MOTION COMPENSATION SYSTEM

(75) Inventors: Chien-Chang Lin, Tainan County (TW); Chan-Shih Lin, Tainan County (TW)

(73) Assignee: Himax Media Solutions, Inc., Fonghua Village, Xinshi Dist., Tainan (TW)

( * ) Notice: Subject to any disclaimer, the term of this patent is extended or adjusted under 35 U.S.C. 154(b) by 285 days.

(21) Appl. No.: 12/693,445

(22) Filed: Jan. 26, 2010

(65) Prior Publication Data
US 2011/0182348 A1    Jul. 28, 2011

(51) Int. Cl.
*H04N 11/02*    (2006.01)
(52) U.S. Cl. ............... 375/240.01; 375/240.24
(58) Field of Classification Search ............ 375/240.01, 375/240.24
See application file for complete search history.

(56) References Cited

U.S. PATENT DOCUMENTS

| | | | | |
|---|---|---|---|---|
| 5,283,561 A | * | 2/1994 | Lumelsky et al. | 715/717 |
| 5,379,356 A | * | 1/1995 | Purcell et al. | 382/233 |
| 5,696,925 A | * | 12/1997 | Koh | 711/203 |
| 5,828,785 A | * | 10/1998 | Kitsuki | 382/232 |
| 2004/0141554 A1 | * | 7/2004 | Phong et al. | 375/240.12 |

* cited by examiner

*Primary Examiner* — Sath V Perungavoor
*Assistant Examiner* — Jeffery Williams
(74) *Attorney, Agent, or Firm* — Winston Hsu; Scott Margo

(57) ABSTRACT

Frame data stored in an external memory is partitioned into a plurality of macroblocks, and a plurality of access units each comprising at least one macroblock are provided. A plurality of frames are fetched from the external memory by loading the plurality of access units in a predetermined sequence. A current data for decoding a macroblock of the first access unit and a reference data for decoding a macroblock of the second access unit are loaded from the first access unit, and respectively mapped to a first memory group and a second memory group of a circular cache according to the frame width.

7 Claims, 6 Drawing Sheets

| Cache Tag | Reconfigurable Group Bit | Fixed MB Bit | Data Select |
|---|---|---|---|

FIG. 5

| ILZD (Frame Width) | Group Bit of Vertical Mode | Group Bit of Horizontal Mode |
|---|---|---|
| 11 | A[12:11] | A[11] |
| 10 | A[11:10] | A[10] |
| 9 | A[10:9] | A[9] |
| 8 | A[9:8] | A[8] |
| Others | A[8:7] | A[7] |

FIG. 6

DATA-MAPPING METHOD AND CACHE SYSTEM FOR USE IN A MOTION COMPENSATION SYSTEM

BACKGROUND OF THE INVENTION

1. Field of the Invention

The present invention is related to a data-mapping method and cache system for use in a motion compensation system, and more particularly, to a data-mapping method and reconfigurable circular cache system operative based on the frame width for use in a motion compensation system.

2. Description of the Prior Art

The ability to quickly and efficiently process video streams has grown in importance, particularly for portable consumer electronic products incorporating more and more multimedia features but still having somewhat limited function relative to more powerful platforms such as personal computers. The data is often encoded (compressed) to facilitate storage and streaming, and then decoded (decompressed) for playback (e.g., display).

H.264/AVC is a compression standard developed by the Joint Video Team (JVT) of ISO/IEC MPEG (Moving Picture Experts Group) and ITU-T VCEG (Video Coding Experts Group), and provides core technologies for efficient storage, transmission and manipulation of video data in multimedia environments. The focus of H.264/AVC is to develop a standard that achieves, among other results, highly scalable and flexible algorithms and bit-stream configurations for video coding, high error resilience and recovery over wireless channels, and highly network-independent accessibility.

In a typical video sequence, the content of one frame, or a least a portion of that frame, may be very similar to that of another frame. A compression technique commonly referred to as "motion compensation" is employed using a cache memory system to exploit temporal or spatial locality, thereby reducing excess memory access when performing motion compensation. If content in a current frame is closely related to that of another (reference) frame, it is possible to accurately represent, or predict, the content of the current frame using the reference frame instead of accessing the entire current frame. Although operations which require off-chip memory access in an H.264/AVC decoder also include reference picture storing, de-blocking, and display feeding, motion compensation accounts for the largest memory bandwidth and is thus the main consideration for performance improvement.

FIG. 1 is a diagram illustrating a prior art cache memory system 100 for use in a motion compensation system. A frame stored in an external memory 12 is partitioned into blocks of pixels (e.g., macroblocks). Several pixels, stored and accessed together in the external memory 12, are defined as an access unit which may include one macroblock or a plurality of macroblocks. Access units of the external memory 12 are sequentially fetched in a left-to-right and up-to-down direction as indicated by the arrow of FIG. 1. A cache 14 comprising 8 concatenated memory banks MK1-MK8, each of which provides memory storage size equal to one macroblock, is configured to store data loaded from the external memory 12.

An access unit is read from the external memory 12 even when part of it is required, and there exists a high probability that the unwanted part of this access unit will be required soon by subsequent access units. FIG. 2a-2c are diagrams illustrating a prior art data-mapping method for use in the cache memory system 100. In FIG. 2a, an access unit AU1 (represented by the dotted line) includes the wanted macroblock B and the currently unwanted data (represented by the striped area) of the frame F1. Both the current macroblock B and the unwanted part of the access unit AU1 is loaded into the memory banks BK1-BK4 of the cache 14. In FIG. 2b, an access unit AU2 (represented by the dotted line) includes the wanted macroblock C and the currently unwanted data (represented by the shaded and the striped area) of the subsequent frame F2. Both the current macroblock C and the unwanted part of the access unit AU2 represented by the striped area is loaded into the memory bank BK5-BK8 of the cache 14. However, the unwanted part of the access unit AU2 represented by the shaded area has been fetched when loading the previous access unit AU1 and can thus be re-used for decoding the current access unit AU2. Similar operations continue for fetching the same row of frame data into corresponding memory banks. Since which memory bank stores an access unit is determined by the frame width, data conflict may occur in the prior art cache memory system 100. As illustrated in FIG. 2c, an access unit AUn (represented by the dotted line) includes the wanted macroblock F and the currently unwanted data (represented by the shaded and striped area) of the frame Fn. If the access unit AUn is to be loaded into the memory banks BK1-BK4 of the cache 14, the previously loaded reference data (represented by the shaded area) is over-written and thus no longer available for decoding the current access unit AUn. This kind of data conflict severely downgrades cache performance.

SUMMARY OF THE INVENTION

The present invention provides a data-mapping method for use in a motion compensation system and comprises partitioning a frame stored in an external memory into a plurality of macroblocks; providing a plurality of access units each comprising at least one macroblock; fetching a plurality of frames from the external memory by loading the plurality of access units in a predetermined sequence; and mapping a current data loaded from a first access unit among the plurality of access units into a first memory group of a circular cache and mapping a reference data loaded from the first access unit into a second memory bank of the circular cache according to a frame width, wherein the current data is for decoding a first macroblock in the first access unit and the reference data is for decoding a second macroblock loaded from a second access unit among the plurality of access units.

The present invention further provides a cache memory system for use in a motion compensation system and comprises an external memory configured to store frame data partitioned into a plurality of macroblocks; a circular cache comprising a plurality of concatenated memory groups and configured to store data loaded from the external memory; and a data-mapping unit configured to perform data-mapping according to a frame width so that a current data loaded from a first access unit including at least one macroblock is stored in a corresponding memory group of the circular cache and a reference data loaded from the first access unit is stored in another corresponding memory group of the circular cache, wherein the current data is for decoding a first macroblock in the first access unit and the reference data is for decoding a second macroblock loaded from a second access unit among the plurality of access units.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating a partitioning of a physical address in the external memory according to the present invention.

FIG. 6 is a lookup table illustrating a method for obtaining the cache index according to the present invention.

DETAILED DESCRIPTION

Figure 1:
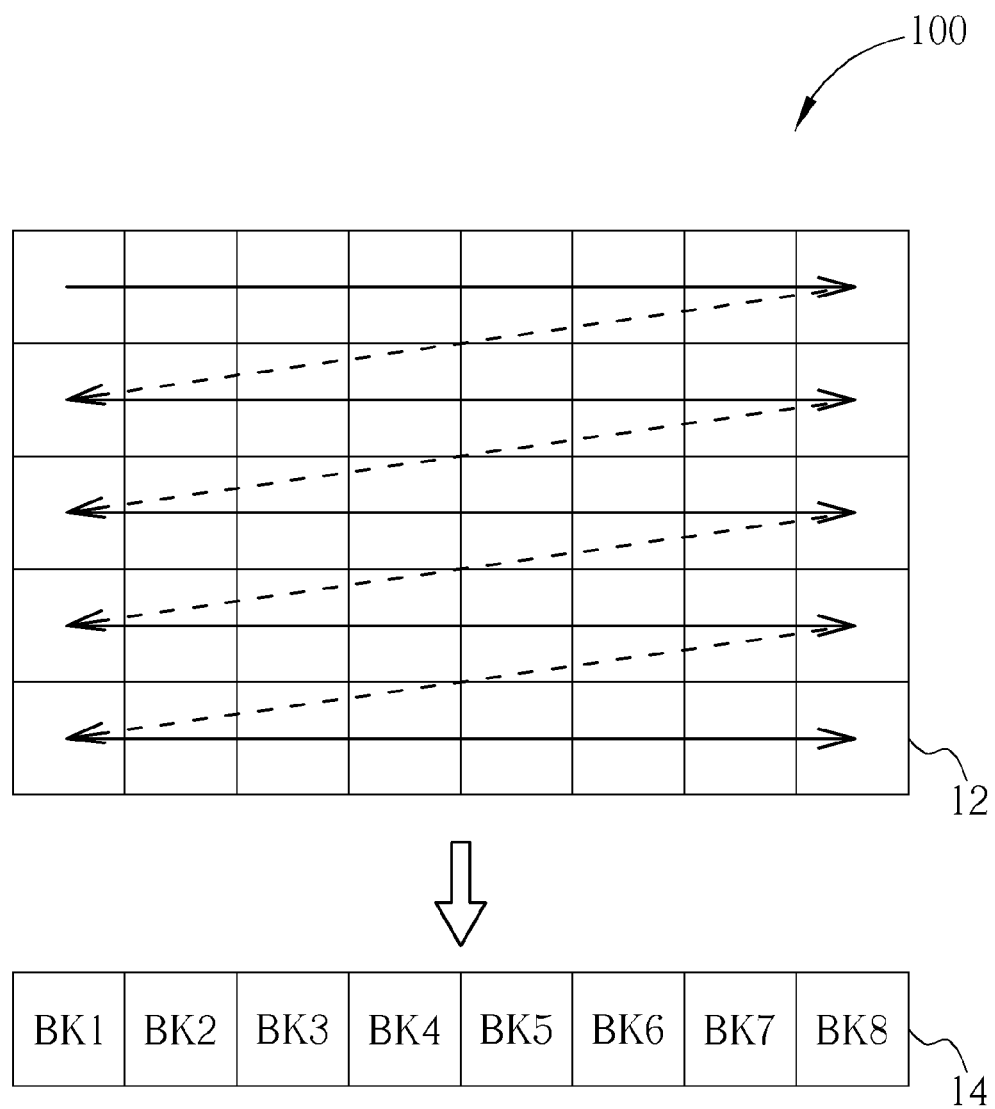
FIG. 1 is a diagram illustrating a prior art cache memory system for use in a motion compensation system.
Figure 2A:
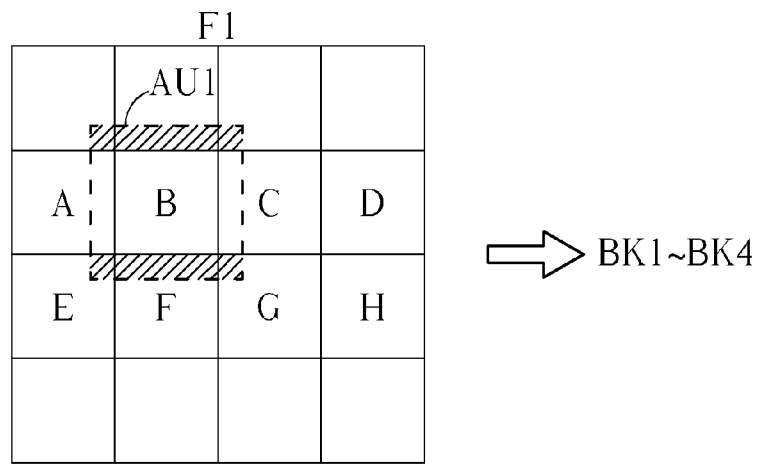
FIG. 2a-2c are diagrams illustrating a prior art data-mapping method for use in the cache memory system of FIG. 1.
Figure 2B:
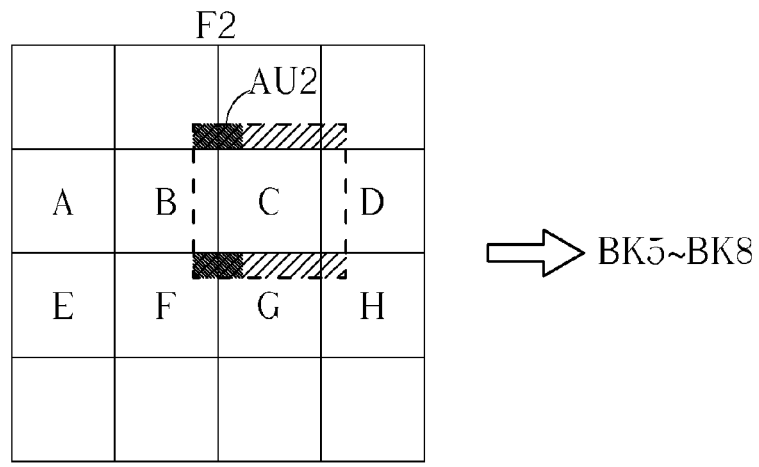
Figure 2C:
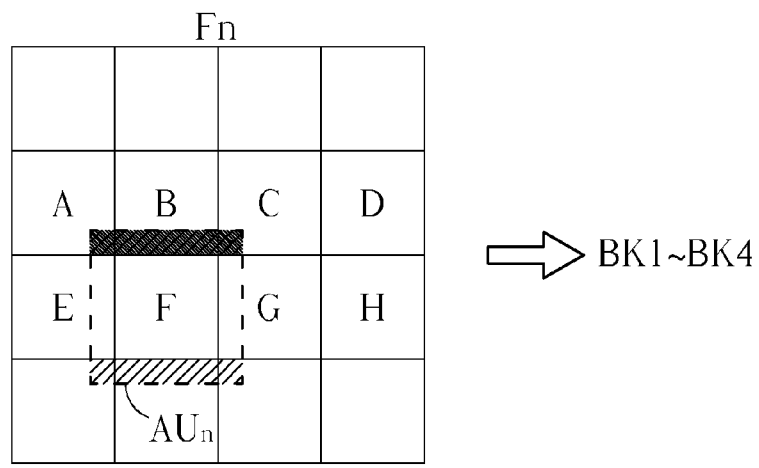
Figure 3:
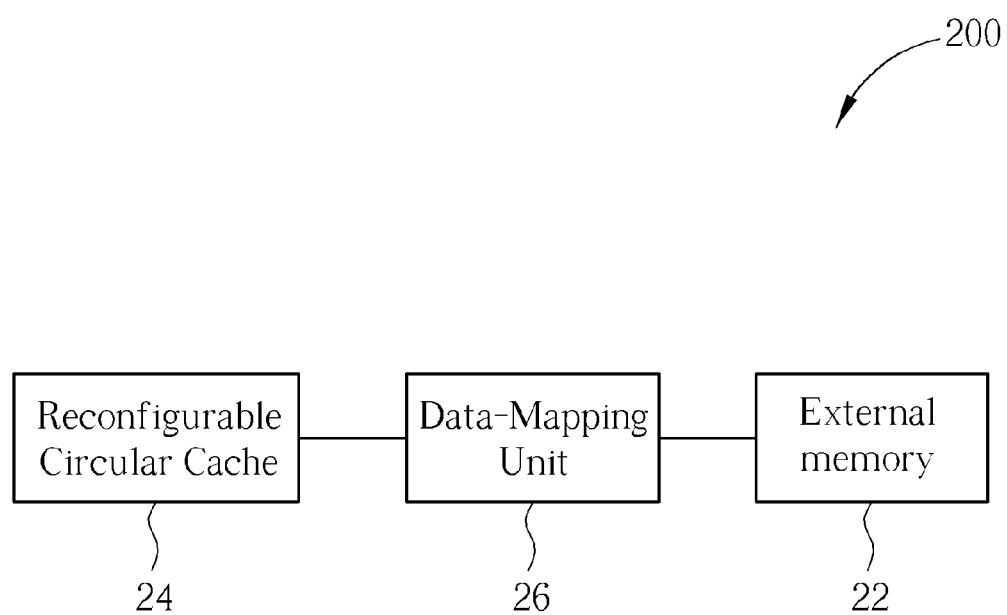
FIG. 3 is a function block diagram illustrating a cache memory system for use in a motion compensation system according to the present invention.

FIG. 3 is a function block diagram illustrating a cache memory system 200 for use in a motion compensation system according to the present invention. The cache memory system 200 includes an external memory 22, a reconfigurable circular cache 24, and a data mapping circuit 26. A frame stored in an external memory 22 can be partitioned into a plurality of macroblocks (such as depicted in FIG. 1). Several pixels, stored and accessed together in the external memory 22, can be defined as an access unit which may include one macroblock or a plurality of macroblocks (such as depicted in FIGS. 2a-2c). Access units of the external memory 22 can be sequentially fetched in a left-to-right and up-to-down direction (such as depicted in FIG. 1), or in other sequences.

Figure 4A:
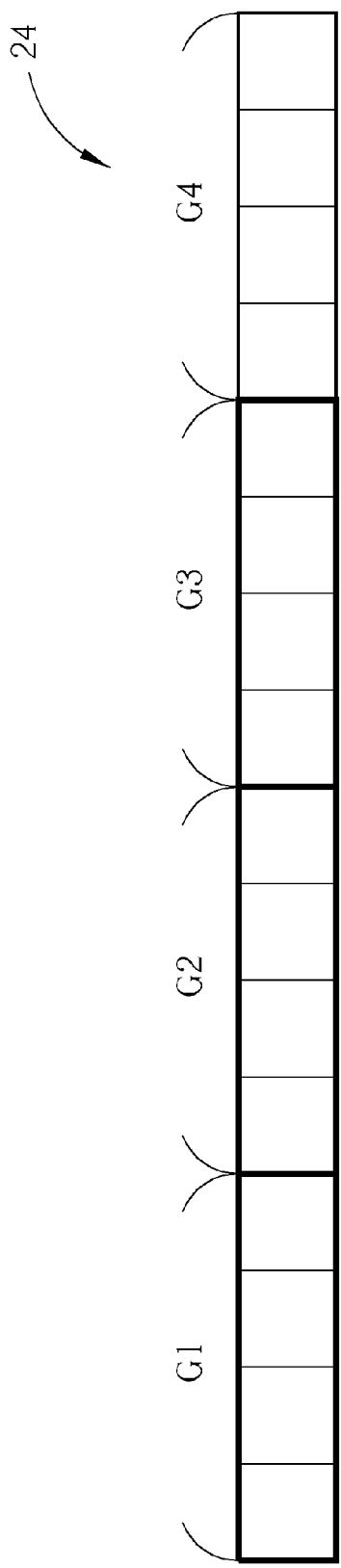
FIGS. 4a and 4b are diagrams illustrating embodiments of the reconfigurable circular cache for used in a motion compensation system according to the present invention.
Figure 4B:
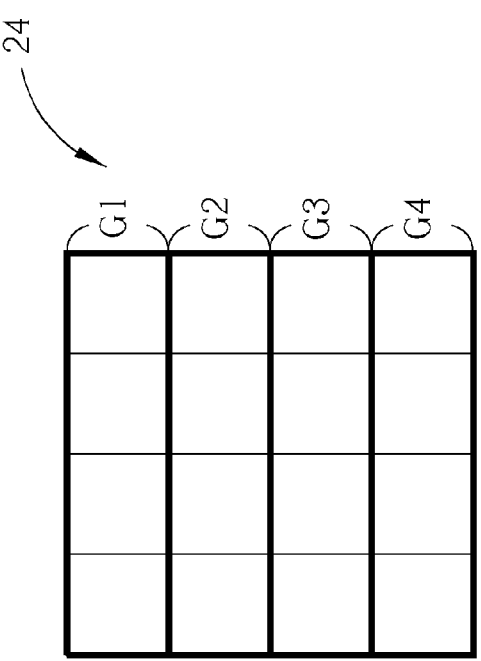

FIGS. 4a and 4b are diagrams illustrating embodiments of the reconfigurable circular cache 24 for used in a motion compensation system according to the present invention. For an N-tap interpolation filter operative based on a 256-byte macroblock (e.g., 16×16 pixel matrix), the maximum reference data size of an access unit is equal to (16+N−1)×(16+N−1) pixels which include 3 macroblocks in horizontal and vertical direction. In the illustrated embodiments of the present invention in FIGS. 4a and 4b, the reconfigurable circular cache 24 having 4 memory groups G1-G4 is provided. Each memory group includes 4 concatenated memory banks, and each memory bank can store data of one macroblock. Therefore, the size of one memory group is equal to 1028 bytes, and the overall size of the reconfigurable cache 24 is equal to 4096 bytes. The proposed circular cache 24 can be reconfigured to meet different motions: if horizontal motion is largely used in the current decoding scheme, the illustrated circular cache 24 may be configured to include 4 horizontally concatenated memory groups G1-G4 each having 4 memory banks, as depicted in FIG. 4a; if vertical motion is largely used in the current decoding scheme, the illustrated circular cache 24 may be configured to include 4 vertically concatenated memory groups G1-G4 each having 4 memory banks, as depicted in FIG. 4b.

In the present cache memory system 200, a data-mapping method is provided using the data-mapping unit 26 so that a previous-fetched reference access unit and its related current access unit are stored in different memory groups of the circular cache 24. For a certain physical address of the external memory 22, the present data-mapping method can proceed by selecting certain bits of the physical address as the cache index of this physical address according to the frame width and the operation mode. FIG. 5 is a diagram illustrating a partitioning of a physical address in the external memory 22 supporting the present data-mapping method. Each physical address of the external memory 22 is divided into 4 portions: cache tag, reconfigurable group bit, fixed MB bit and data select. The number of the group bits and the fixed MB bits is dependant on the operation mode: in the horizontal mode, the fixed MB bits comprising address bits A[6:1] are used for addressing 64 image columns, while the group bit comprising an address bit A[7] is used from addressing one image row; in the vertical mode, the fixed MB bits comprising address bits A[5:1] are used for addressing 32 image columns, while the group bits comprising address bits A[7:6] are used for addressing 2 image rows. Each physical address of the external memory 22 is mapped into a corresponding cache location according to a cache index which contains certain selected bits of the physical address according to the frame width and the operation mode.

FIG. 6 is a lookup table illustrating a method for obtaining the cache index according to operation modes and the frame width. ILZD (leading zero detection) listed in the left-most column of the lookup table represents the number of zeros in the binary representation of a certain frame width. The group bits of the vertical mode corresponding to different frame widths are listed in the middle column, while the group bits of the horizontal mode corresponding to different frame widths are listed in the right-most column. For example, if the frame width is 1280 bits, 8 zeros can be obtained by performing inverse leading zero detection. When mapping a physical address $(1100111001001101000)_2$ of the external memory 22 in the vertical mode, data is loaded to a corresponding cache location indicated by a 7-bit cache index (0110100) which comprises the address bits A[6:1] and A[8] of the physical address. When mapping the same physical address $(1100111001001101000)_2$ of the external memory 22 in the horizontal mode, data is loaded to a corresponding cache location indicated by a 8-bit cache index (10110100) which comprises the address bits A[6:1] and A[8:9] of the physical address.

Figure 7:
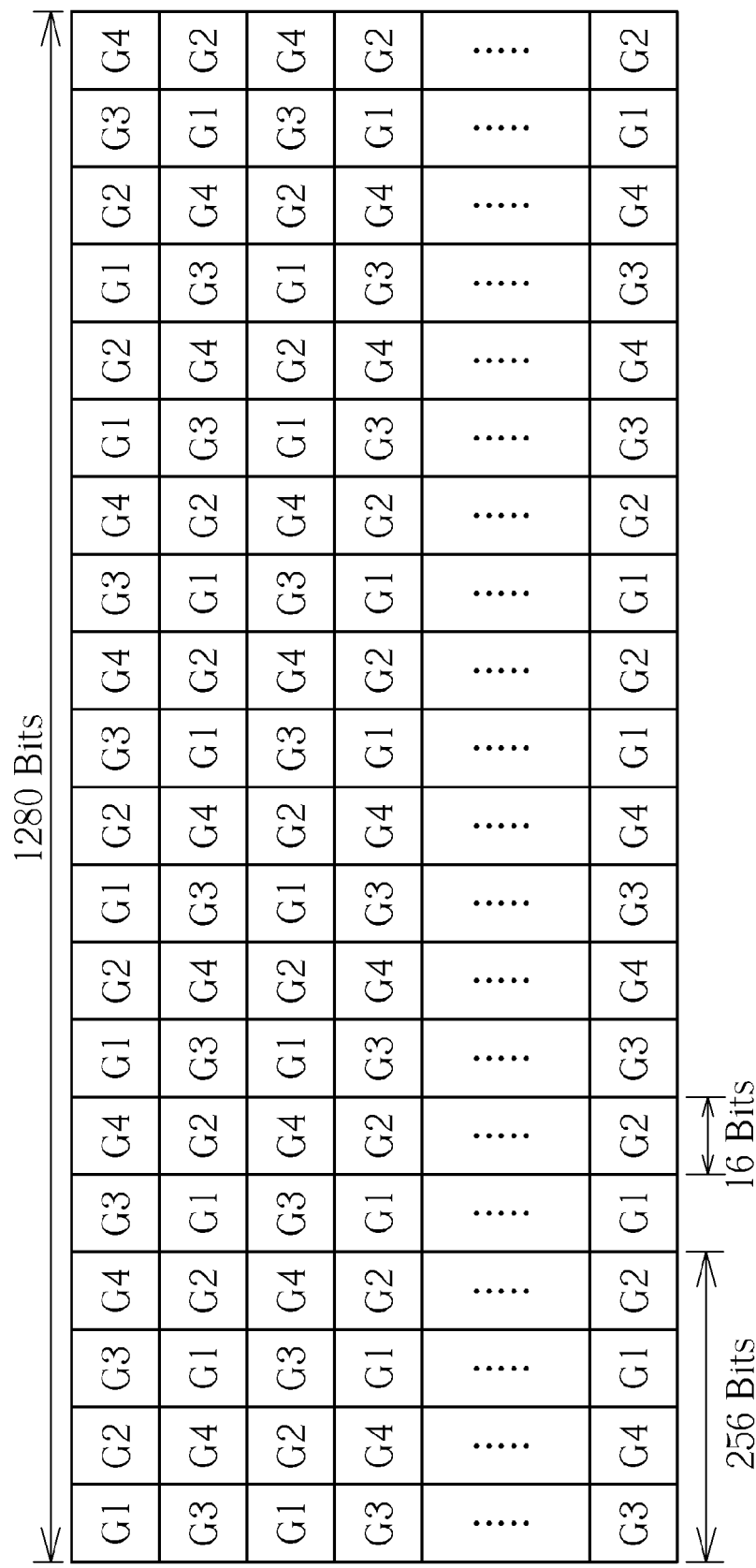
FIG. 7 is a diagram illustrating the relationship between the access units of a frame and the corresponding cache locations.

FIG. 7 is a diagram illustrating the relationship between the access units of a frame and the corresponding cache locations. Assuming the frame width is equal to 1280 bits, FIG. 7 illustrates corresponding memory groups to which the access units of the frame are respectively mapped in the horizontal mode. For example, the first row of access units are loaded into the memory groups of the circular cache 24 in a G1-G2-G3-G4-G3-G4-G1-G2 sequence after performing data mapping using the data mapping unit 26; the second row of access units are loaded into the memory groups of the circular cache 24 in a G3-G4-G1-G2-G1-G2-G3-G4 sequence after performing data mapping using the data mapping unit 26; the same goes on until the all frame data has been loaded. Therefore, data conflict can be avoided in the present invention.

The proposed cache memory system 200 may be applicable for use in an H.264/AVC system supporting variable block-size motion compensation (VBSMC) in which the frames are partitioned into variously-sized macroblock and each macroblock can be partitioned in different ways, such as 16×16, 16×8, 8×16, 8×8, 8×4, 4×8 and 4×4. However, the present invention may also be applied to systems using other standards, such as an MPEG-4 system supporting block motion compensation (BMC) in which the frames are partitioned into 256-byte macroblock with 16×16 partition.

Depending on the desired configuration, the proposed reconfigurable cache 24 may include 4 memory groups concatenated in the horizontal direction or in the vertical direction according to the operation mode. The number of memory groups in the reconfigurable cache 24, the orientation of the memory groups, and the number of memory banks in a memory group may vary in other applications. The embodiments illustrated in FIGS. 4a and 4b are merely for illustrative purposes, and do not limit the scope of the present invention.

The present invention provides a data-mapping method and a cache memory system for reducing bandwidth requirement in a motion compensation system. After fetching data from an external memory, data-mapping is performed according to the frame width and operation mode so that each physical address can be assigned a cache index which corresponds to its mapped location in a reconfigurable circular cache memory system without causing data conflict.

Those skilled in the art will readily observe that numerous modifications and alterations of the device and method may be made while retaining the teachings of the invention.

What is claimed is:

1. A data-mapping method for use in a motion compensation system, comprising:
    partitioning a frame stored in an external memory into a plurality of macroblocks;
    providing a plurality of access units each comprising at least one macroblock;
    fetching a plurality of frames from the external memory by loading the plurality of access units in a predetermined sequence; and
    providing a first cache index corresponding to a first memory group of a circular cache for a current data by selecting a plurality of bits in a first physical address of the external memory which is associated with the current data according to a frame width, wherein the current data is for decoding a first macroblock in the first access unit among the plurality of access units;
    providing a second cache index corresponding to a second memory group of the circular cache for a reference data by selecting a plurality of bits in a second physical address of the external memory which is associated with the reference data according to the frame width, wherein the reference data is for decoding a second macroblock loaded from a second access unit among the plurality of access units;
    mapping the current data to the first memory group according to the first cache index and mapping the reference to the second memory group according to the second cache index.

2. The data-mapping method of claim 1 further comprising:
    providing the circular cache comprising a plurality of memory groups.

3. The data-mapping method of claim 2 wherein the plurality of memory groups are concatenated in a horizontal direction or a vertical direction according to an operational mode of data decoding.

4. The data-mapping method of claim 1 wherein each memory group includes a plurality of memory banks each providing a storage size equal to one macroblock.

5. The data-mapping method of claim 1, wherein:
    the first cache index is provided by selecting the plurality of bits in the first physical address of the external memory according to the frame width and an operational mode of data decoding; and
    the second cache index is provided by selecting the plurality of bits in the second physical address of the external memory according to the frame width and the operational mode of data decoding.

6. A cache memory system for use in a motion compensation system, comprising:
    an external memory configured to store frame data partitioned into a plurality of macroblocks;
    a circular cache comprising a plurality of concatenated memory groups and configured to store data loaded from the external memory; and
    a data-mapping unit configured to:
        receive a current data and a reference data loaded from a first access unit which includes at least one macroblock, wherein the current data is for decoding a first macroblock in the first access unit and the reference data is for decoding a second macroblock in the first access unit;
        provide a first cache index corresponding to a first memory group of the circular cache for a current data by selecting a plurality of bits in a first physical address of the external memory which is associated with the current data according to a frame width;
        provide a second cache index corresponding to a second memory group of the circular cache for a reference data by selecting a plurality of bits in a second physical address of the external memory which is associated with the reference data according to the frame width; and
        map the current data to the first memory group according to the first cache index and map the reference to the second memory group according to the second cache index.

7. The cache memory system of claim 6, wherein:
    the first cache index is provided by selecting the plurality of bits in the first physical according to the frame width and an operational mode of data decoding; and
    the second cache index is provided by selecting the plurality of bits in the second physical according to the frame width and the operational mode of data decoding.

* * * * *